United States Patent
Sadafale (10) Patent No.: US 7,725,522 B2
(45) Date of Patent: May 25, 2010

(54) HIGH-SPEED INTEGER MULTIPLIER UNIT HANDLING SIGNED AND UNSIGNED OPERANDS AND OCCUPYING A SMALL AREA

(75) Inventor: Mangesh Devidas Sadafale, Nagpur (IN)

(73) Assignee: Texas Instruments Incorporated, Dallas, TX (US)

( * ) Notice: Subject to any disclaimer, the term of this patent is extended or adjusted under 35 U.S.C. 154(b) by 1080 days.

(21) Appl. No.: 11/308,592

(22) Filed: Apr. 10, 2006

(65) Prior Publication Data

US 2006/0253521 A1 Nov. 9, 2006

Related U.S. Application Data

(60) Provisional application No. 60/671,860, filed on Apr. 14, 2005.

(51) Int. Cl.
*G06F 7/523* (2006.01)
(52) U.S. Cl. .................................. 708/625
(58) Field of Classification Search ............... None
See application file for complete search history.

(56) References Cited

U.S. PATENT DOCUMENTS

| | | | | |
|---|---|---|---|---|
| 5,422,805 A | * | 6/1995 | McIntyre et al. | 708/625 |
| 6,370,559 B1 | * | 4/2002 | Hoffman | 708/625 |
| 7,315,163 B2 | * | 1/2008 | Takeuchi | 324/158.1 |
| 2005/0223054 A1 | * | 10/2005 | Lo | 708/625 |

\* cited by examiner

*Primary Examiner*—David H Malzahn
(74) *Attorney, Agent, or Firm*—Steven A. Shaw; W. James Brady; Frederick J. Telecky, Jr.

(57) ABSTRACT

A high-speed integer multiplier unit multiplying operands, wherein each operand can be either signed or unsigned. Type data is received for each operand which indicates whether the corresponding operand is to be treated as signed or unsigned. An extend bit is appended to each operand to provide extended operands, where the extend bit is the most significant bit of the corresponding operand if type data indicates that the operand is signed, and the extend bit is a logic zero otherwise. The extended operands are multiplied using a signed multiplication operation to provide the result. Overflow detection is done in parallel to the multiply operation, thus moving overflow-detection logic from the timing-critical path from the multiplier block's input to its output. The throughput performance of the multiplier unit is improved as a result.

9 Claims, 8 Drawing Sheets

HIGH-SPEED INTEGER MULTIPLIER UNIT HANDLING SIGNED AND UNSIGNED OPERANDS AND OCCUPYING A SMALL AREA

RELATED APPLICATION

The present application is related to and claims priority from co-pending U.S. provisional application Ser. No. 60/671,860, filed: Apr. 14 2005, entitled, "Low Area and High Speed Multiplier Unit for Synthesizable CPU in DSL Application", naming the same inventor as in the present application, and is incorporated by reference in its entirety herewith.

BACKGROUND

1. Field of the Invention

The present invention relates generally to integrated circuits (IC) and more specifically to a method and apparatus for high-speed integer multiplication of signed and/or unsigned operands.

2. Related Art

An integer multiplier unit generally receives two integers (operands) to be multiplied and provides their product as an output. Often, each integer is received as an N-bit number and the result is provided as a (2*N) bit number. Integer multiplier units are often contained in arithmetic logic units (ALU) that perform various arithmetic operations on digital representations of numbers.

A multiplier unit may have to handle both signed and unsigned numbers. In the case of unsigned numbers, all the bits together generally represent the magnitude. In the case of signed numbers, the digits can represent either a positive number or a negative number. Signed numbers are represented using conventions such as twos complement representations.

In addition, a multiplier unit may need to indicate whether the result of the multiplication cannot be represented by the output bits (called an overflow condition). For example, in multiplication of two signed numbers represented in 2's complement form of N-bits each, a overflow would occur when both the signed numbers are maximum negative numbers (i.e., 1 in the most significant bit and 0 in all other positions), assuming (2N−1) bits of output.

The multipliers units may need to be implemented meeting several requirements. For example, it may be desirable to implement units while meeting requirements such as higher throughput performance and/or lower area consumed, etc.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A multiplier unit provided according to an aspect of the present invention generates the value of the overflow bit in parallel to computation of a product of extended bit representations of the two integers sought to be multiplied. An extended bit representation is generated by appending an extra bit to each integer, with the extended bit having the value of the most significant bit (MSB) of the integer when the integer is to be treated as a signed integer, and a logic 0 otherwise. A multiplexer may select as the multiplication result the product of the two extended integers in case there is no overflow, and a default saturation value otherwise. The overflow bit is also provided as an output of the multiplier unit.

In an embodiment, the overflow bit is computed by comparing each of the input integers with a maximum possible negative value representable by the N-bits (assuming each input integer is signed and represented by N bits). Only if both the input integers equal such maximum value and the product is represented using (2N−1) bits, the overflow bit is set.

Due to such an approach, the entire multiplier unit can be implemented using only a single signed multiplier block, thereby reducing the area requirements. In addition, the throughput performance is also enhanced due to the parallel computations of the overflow bit and the multiplication operation.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

The features of the invention will be clearer in comparison with a prior embodiment which does not implement at least some features of the invention. Accordingly, the description is provided first with respect to a prior embodiment.

2. Prior Embodiment

Figure 1:
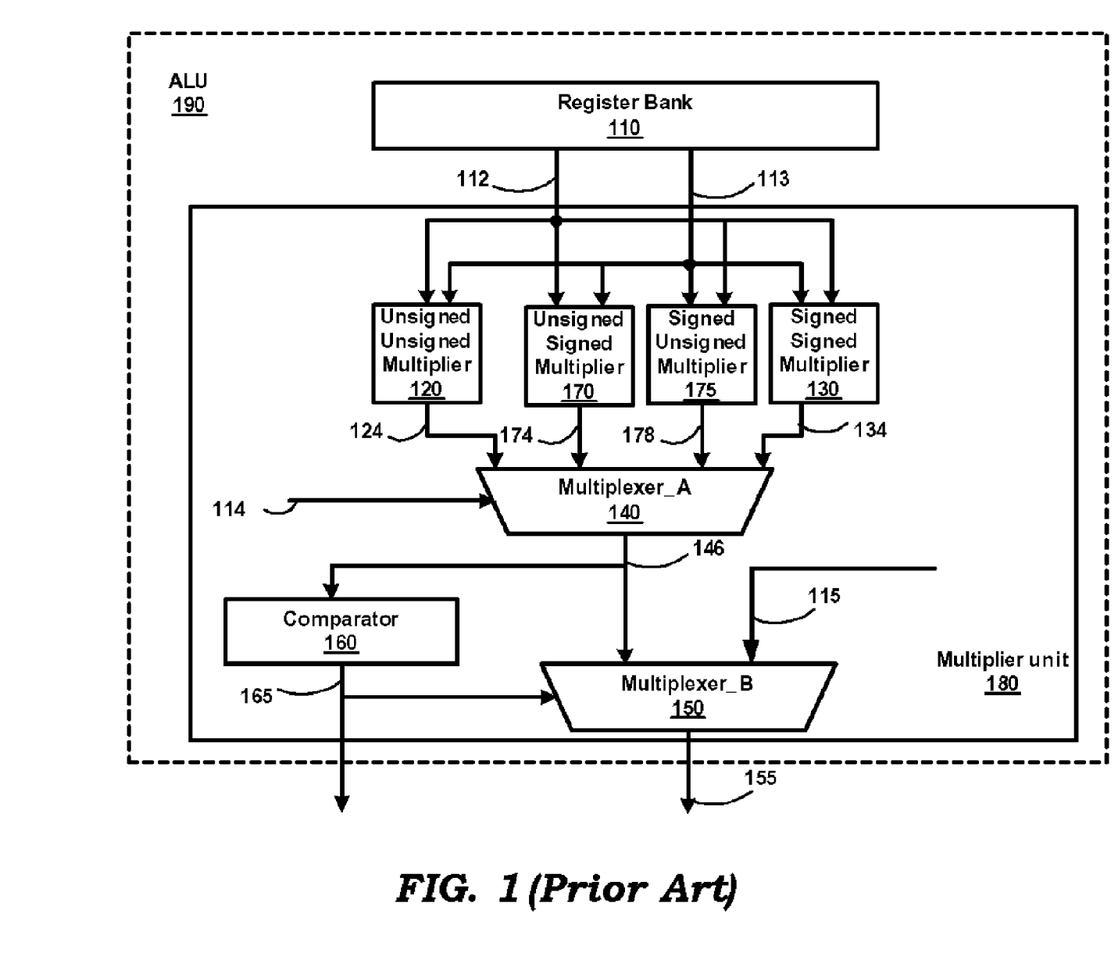
FIG. 1 is a block diagram illustrating the details of a multiplier unit in one prior embodiment.

FIG. 1 is a block diagram of a prior arithmetic logic unit (ALU) in which several aspects of the present invention can be implemented. The diagram shows a multiplier unit (MU) 180 and register bank (RB) 110 contained in ALU 190. MU 180 is shown containing unsigned-unsigned multiplier block (UUMB) 120, unsigned-signed multiplier block (USMB) 170, signed-unsigned multiplier block (SUMB) 175, signed-signed multiplier block (SSMB) 130, multiplexer_A (MUX_A) 140, multiplexer_B (MUX_B) 150, and comparator 160. MU 180 receives two integers (for example two 16-bit numbers) to be multiplied on paths 112 and 113, and provides their product (or a pre-determined constant value) on path 155 and an overflow bit on path 165. The components shown in FIG. 1 are further described below.

Register bank (RB) 110 stores two integers to be multiplied in internal registers and provides the integers to each of UUMB 120, USMB 170, SUMB 175 and SSMB 130 via paths 112 and 113. RB 110 may contain a number of registers which may be used as general purpose registers by ALU 190. A signed integer is stored/provided in twos complement form. Integers to be multiplied are supplied to RB 110 through ALU 190.

UUMB 120, USMB 170, SUMB 175 and SSMB 130 each receives integers to be multiplied on paths 112 and 113, and provide a product on paths 124, 174, 178 and 134 respectively. UUMB 120 treats each received integer as unsigned while performing a multiplication operation.

USMB 170 provides a valid product when the integer on path 112 is unsigned and the integer on path 113 is signed. SUMB 175 provides a valid product when the integer on path 112 is signed and the integer on path 113 is unsigned. SSMB 130 provides a valid product when both integers are signed.

MUX_A 140 forwards on path 146 one of products received on paths 124, 174, 178 and 134 based on a control signal received on path 114 from a control unit (not shown). The control signal on path 114 is generated such that the desired output (the specific desired one of products on paths 124, 174, 178 and 134) is forwarded on path 146.

Comparator 160 compares the output received from MUX-A 140 on path 146 with a predetermined value equal to the largest negative number representable in the system to determine whether an overflow condition has occurred during the multiplication of the integers on paths 124 and 134. If a comparison shows that an overflow has occurred, comparator 160 outputs a logic 1 on path 165. If no overflow has occurred, comparator outputs a logic 0 on path 165. The output of comparator 160 represents an overflow bit and is provided to MUX_B 150 and may also be used by ALU 190 for further processing.

MUX_B 150 receives the output of MUX_A 140 on path 146, and a pre-determined constant value on path 115 from a control logic (not shown) MUX_B 150 provides one of the data received on paths 146 and 115 on path 155 based on the output of comparator 160. If the output of comparator 160 on path 165 indicates an overflow (logic 1 output), MUX_B 150 provides on path 155 the predetermined value received on path 115. If the output of comparator 160 on path 165 indicates no overflow (logic 0 output), MUX_B 150 provides on path 155 the product received on path 146. The predetermined value received on path 155 is usually a saturation value representing the largest positive number representable in the system used (based on register/multiplier block data widths).

It may be appreciated from the description above that four separate multiplier blocks are used, and the output is selected by a multiplexer. Such an approach may lead to a larger area in a circuit implementation of the above described approach, and hence may not be desirable.

It may also be appreciated that overflow detection is performed after a multiplication is performed (i.e., sequentially). Thus the time taken for a result (either a product or a saturation value) to be provided on path 155 may be unacceptably long.

The present invention provides a method and apparatus for a high-speed integer multiplier unit handling signed and unsigned integers and occupying a small area. Further, approaches according to the present invention may yield a circuit realization that is not dependent on the optimization techniques used in software tools.

3. Method

FIG. 2 is a flow chart illustrating the method by which integer multiplication may be performed according to an aspect of the present invention. The flowchart starts in step 201 where control immediately passes to step 205.

Figure 2A:
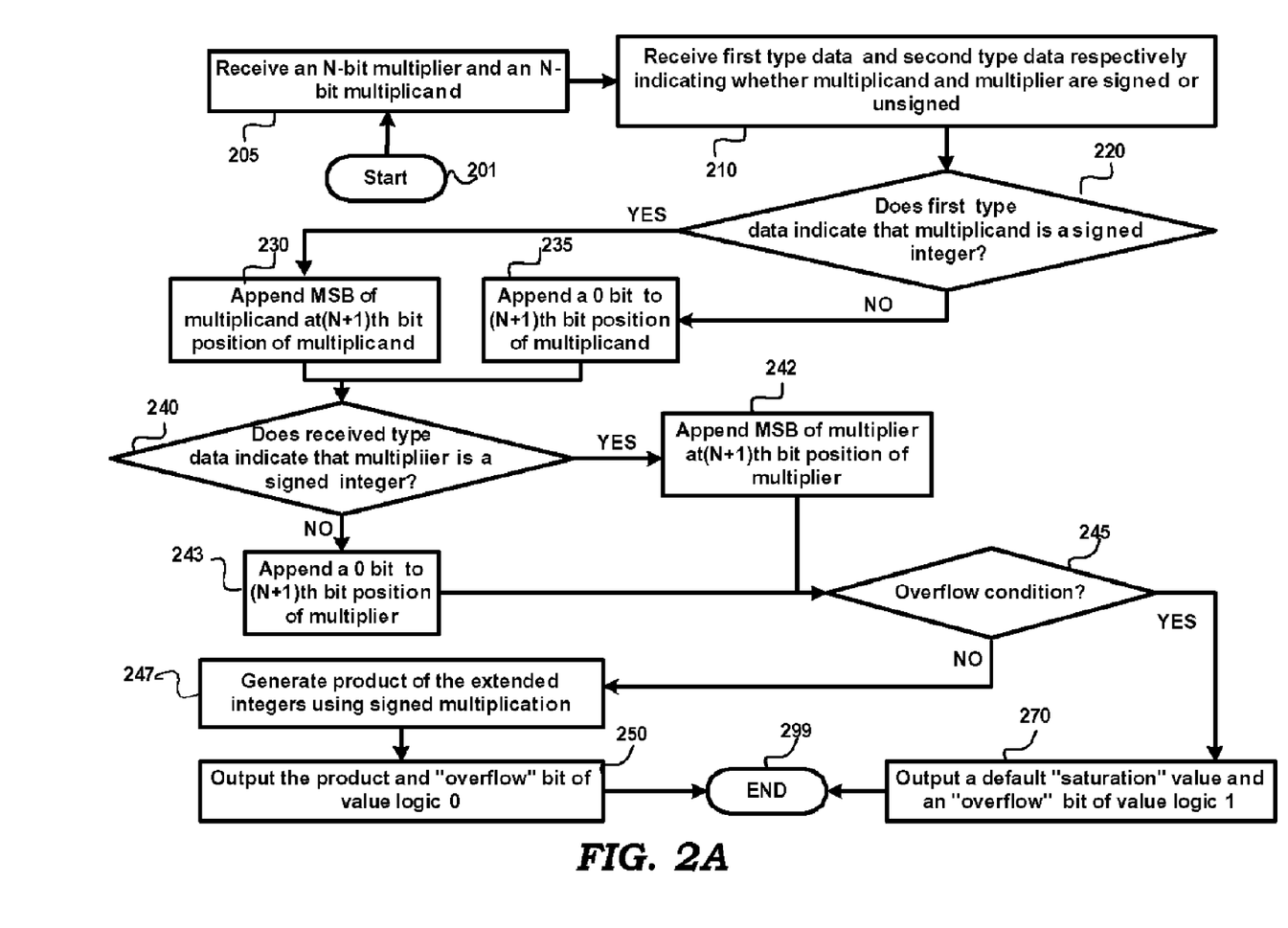
FIG. 2A is a flow chart illustrating the manner in which multiplication operation is performed according to an aspect of the present invention.

In step 205, two integers, an N-bit multiplier and an N-bit multiplicand whose product is to be formed are received. Control then passes to step 210.

In step 210, a type data is received for each of multiplier and multiplicand which indicates whether the N-bit multiplicand/N-bit multiplier) received in step 205 is to be treated as signed or unsigned. The type data may be received in the form of a bit and may be a logic 0 if the multiplicand (multiplier) is to be treated as an unsigned integer, and a logic 1 if the multiplicand (multiplier) is to be treated as a signed integer. Control passes to step 220.

In step 220, the type data received for the multiplicand is checked. If the type data indicates that the multiplicand is to be treated as a signed integer control passes to step 230, else control passes to step 235.

In step 230, the most significant bit (MSB) of the multiplicand is appended at the (N+1)th bit position of the multiplicand. Control passes to step 240. In step 235, a logic 0 bit is appended at the (N+1)th bit position of the multiplicand Control passes to step 240.

In step 240, the type data received for the multiplier is checked. If the type data indicates that the multiplier is to be treated as a signed integer control passes to step 242, else control passes to step 243. In step 242, the most significant bit (MSB) of the multiplier is appended at the (N+1)th bit position of the multiplier. Control passes to step 245.

In step 243, a logic 0 bit is appended at the (N+1)th bit position of the multiplier. Control passes to step 245. The (N+1)-bit wide multiplicand and multiplicand received in step 245 below are referred to as extended integers.

In step 245, it is determined whether an overflow condition exists for the result of the multiplication. In an embodiment, overflow condition would be applicable only in the case where both the input integers are signed and when both the input integers have the maximum negative value. Thus, if each of multiplicand and multiplier is signed and represents the largest negative number an overflow bit is set to logic 1, and control passes to step 270, else the overflow bit is set to logic 0 and control passes to step 247.

In step 247, a product of the (N+1)-bit (extended)multiplier and (N+1)-bit (extended) multiplicand received from step 230 or step 240 is generated using signed multiplication. Signed multiplication may be performed in a known way. Thus, step 247 treats all multiplication as signed multiplication, irrespective of whether signed or unsigned integers are received in step 205. Control then passes to step 250.

In step 250, the product generated in step 247 and the overflow bit (logic 0) are provided as outputs. Control then passes to step 299 where the flow chart ends.

In step 270, a default "saturation value" representing the largest positive number representable in N bits, along with the overflow bit (logic 1) are provided as outputs. Control passes to step 299 where the flow chart ends.

The steps described above are illustrated further with examples below.

4. Unsigned-Unsigned Multiplication

Figure 2B:
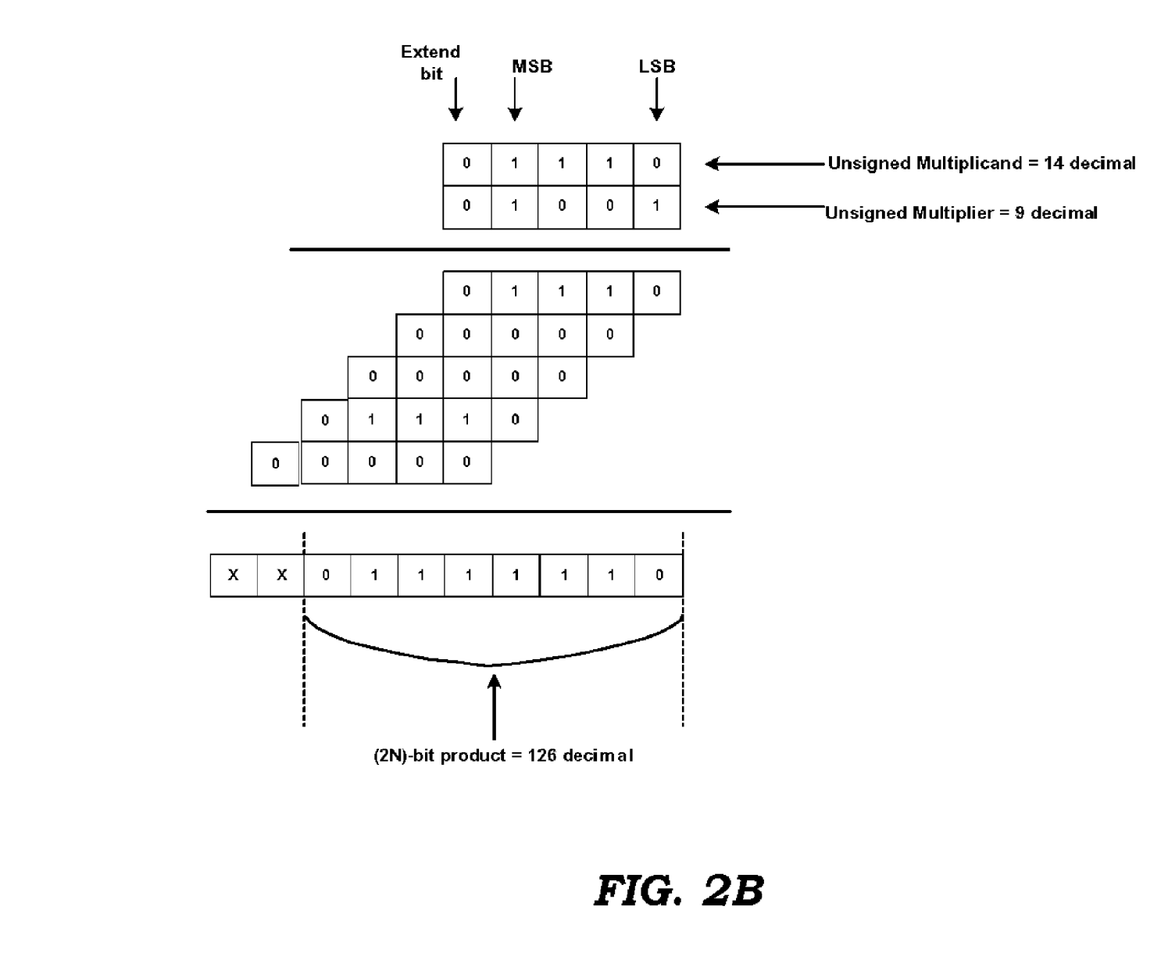
FIG. 2B is a diagram illustrating multiplication of two unsigned integers in an example approach.

FIG. 2B illustrates an example where two unsigned integers each 4-bits wide are multiplied according to the flowchart of FIG. 2A. In the description below the multiplicand is referred to as A and multiplier as B.

In step 205, multiplicand (A) with binary value 1110 (14 in decimal) and multiplier (B) 1001 (9 in decimal) are received. In step 210, type data in the form of a logic 0 is received for each of A and B indicating that A and B are to be treated as unsigned integers. In steps 220/240, type data is checked and it is determined that type data indicates that A and B are to be treated as unsigned integers. Thus, control would pass to steps 235 and 243.

In steps 235/243, a logic 0 bit is appended to the 5th bit position of each A and B. In step 247, signed multiplication of A with B is performed. As shown in FIG. 2B, intermediate (partial) products are generated and the product is obtained as decimal 60 (contained in 2N lower order bits). In step 250, the product (decimal 126) generated in step 247 and the overflow bit of value logic 0 are provided as outputs.

5. Signed-Signed Multiplication

Figure 2C:
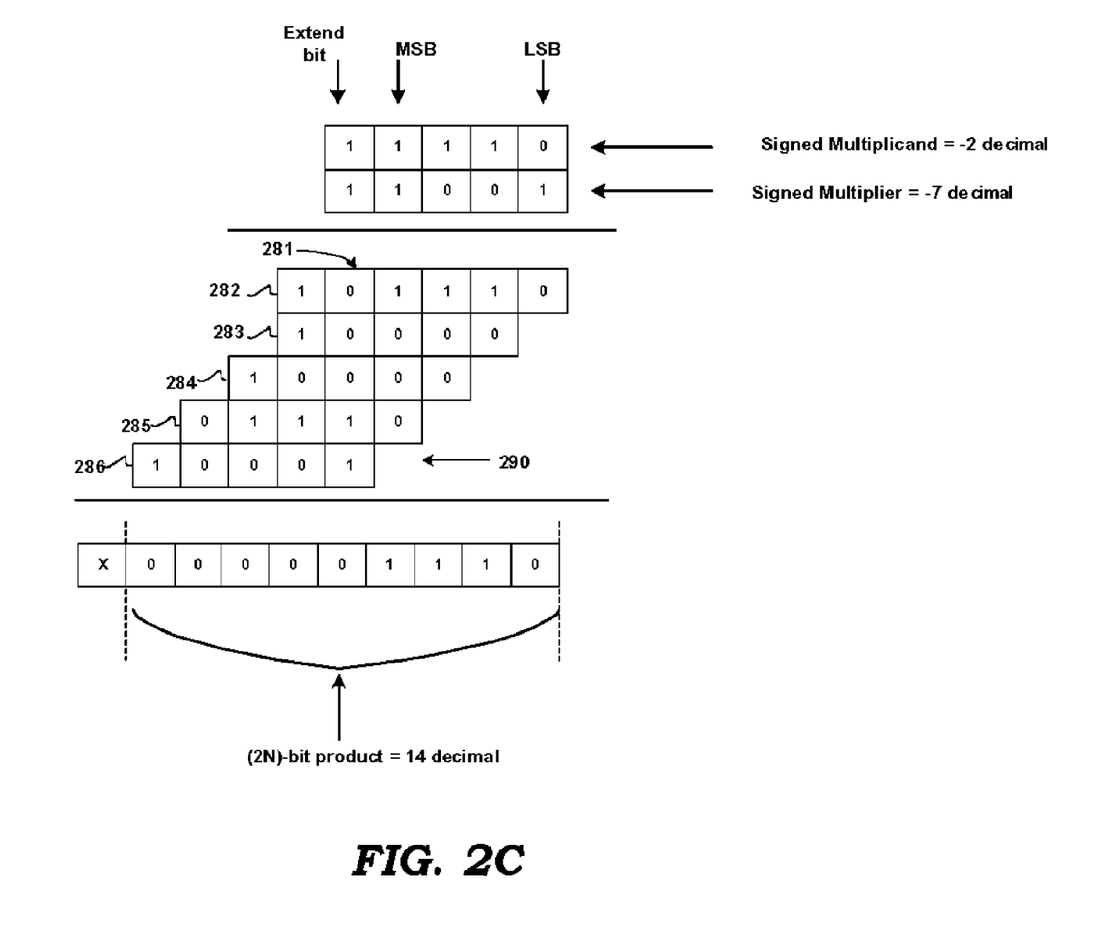
FIG. 2C is a diagram illustrating multiplication of two signed integers in an example approach.

FIG. 2C illustrates an example where two signed integers each 4-bits wide are multiplied according to the flowchart of FIG. 2A. In the description below also the multiplicand is referred to as A and multiplier as B.

In step 205, multiplicand (A) with binary value 1110 (−2 in decimal) and multiplier (B) 1001 (−7 in decimal) are received. In step 210, type data in the form of a logic 1 for each of A and B is received indicating that A and B are to be treated as signed integers. In step 220, type data is checked and it is determined that type data indicates that A and B are to be treated as signed integers. Thus, control would pass to steps 230/242.

In steps 230/242, a logic 1 bit (being the MSB of both A as well as B) is appended to the 5th bit position of each A and B.

In step 245, each of A and B is compared with a value binary 1000 (−8 decimal being the largest negative number in a 4-bit signed representation). Since at least one of A and B is not equal to binary 1000 overflow bit is a value logic 0, and control passes to step 247.

In step 247, signed multiplication of A with B is performed. As shown in FIG. 2C, intermediate(partial) products may be generated. Bits shown as 281, 283, 284 and 285 and all bits in partial product (row) 290 except bit 286 are obtained by an AND followed by an invert process (of the corresponding bits in multiplicand and multiplier), while all other bits are obtained by an AND process. Bit 282 is always a logic 1 in signed multiplication. Other approaches (e.g., using more hardware) for signed multiplication may also be used. The (2N)-bit product is obtained as decimal 14, by neglecting the higher order bits.

In step 250, the product (decimal 14) generated in step 247 and the overflow bit of value logic 0 are provided as outputs, correctly representing the desired result of the multiplication.

6. Unsigned-Signed Multiplication

Figure 2D:
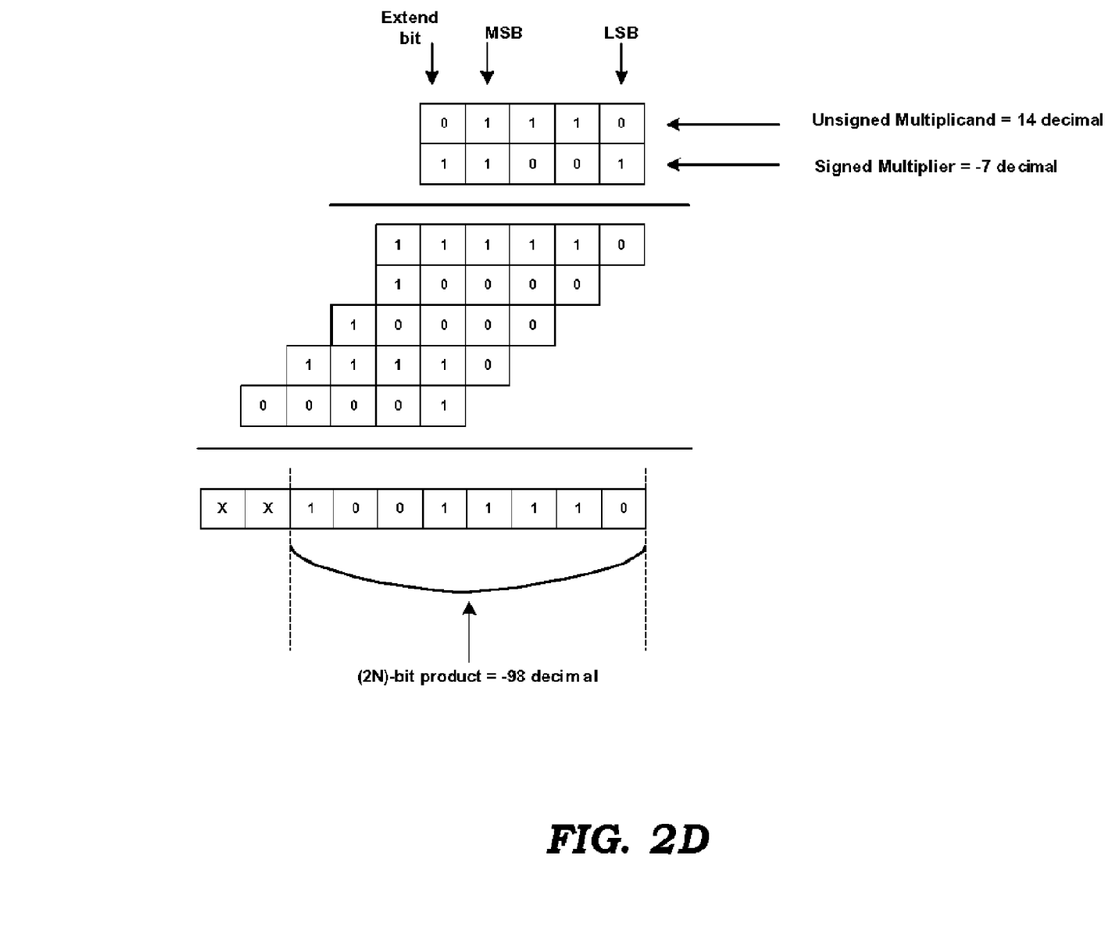
FIG. 2D is a diagram illustrating multiplication of an unsigned multiplicand and a signed multiplier in an example approach.

FIG. 2D illustrates an example where an unsigned multiplicand a signed multiplier each 4-bits wide are multiplied according to the flowchart of FIG. 2A. In the description below also the multiplicand is referred to as A and multiplier as B.

In step 205, multiplicand (A) with binary value 1110 (14 in decimal) and multiplier (B) 1001 (−7 in decimal) are received. In step 210, type data in the form of a logic 0 for A and a logic 1 for B is received indicating that A is an unsigned number and B a signed number. In step 220, type data is checked and it is determined that type data indicates that A is unsigned and B signed. Thus, control would pass to steps 235/243.

In steps 235/243, a logic 0 bit is appended to the 5th bit position of A and a logic 1 bit (being the MSB of B) is appended to the 5th bit position of B.

In step 245, each of A and B is compared with a value binary 1000 (−8 decimal being the largest negative number in a 4-bit signed representation). Since at least one of A and B is not equal to binary 1000 overflow bit is a value logic 0, and control passes to step 247.

In step 247, signed multiplication of A with B is performed. The (2N)-bit product is obtained as decimal −98 (in twos complement form), by neglecting the higher order bits.

In step 250, the product (decimal −98) generated in step 247 and the overflow bit of value logic 0 are provided as outputs, correctly representing the desired result of the multiplication.

7. Signed-Unsigned Multiplication

Figure 2E:
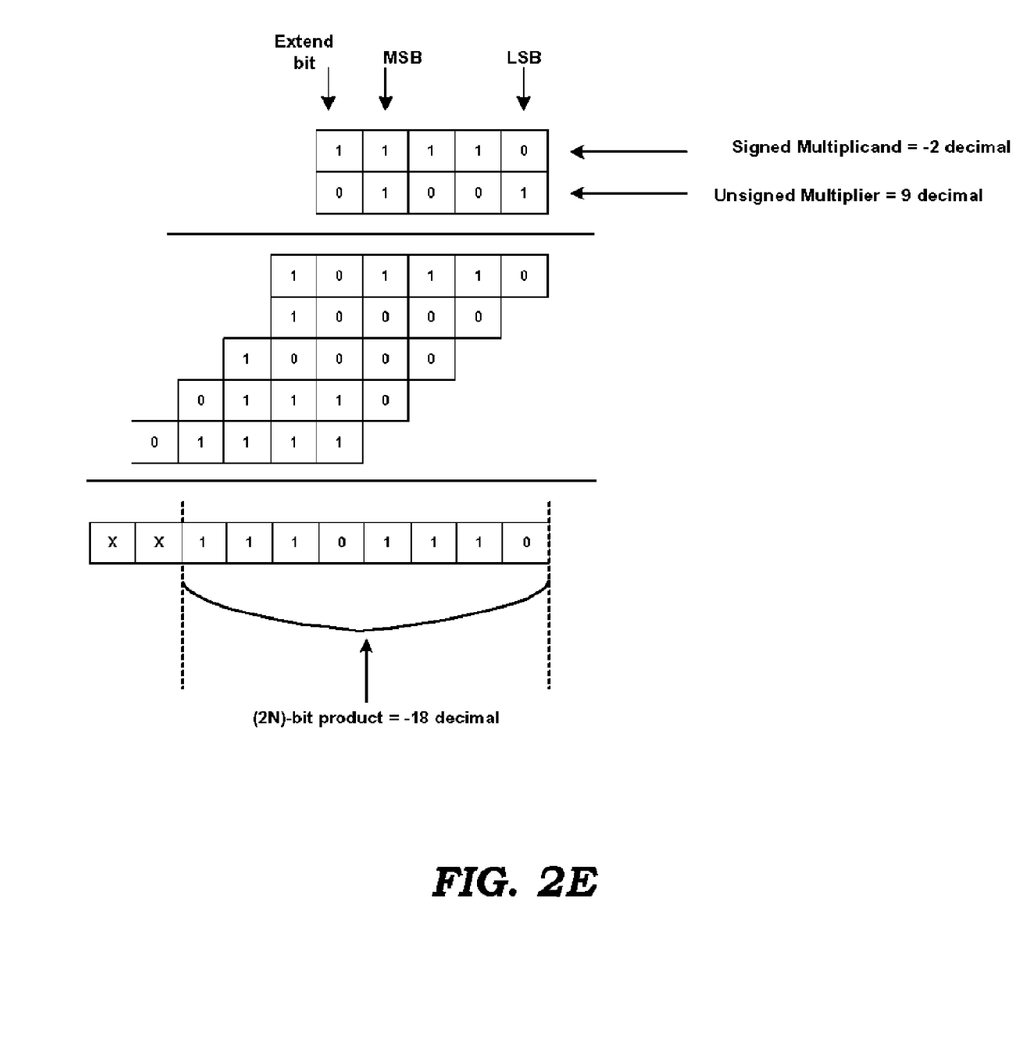
FIG. 2E is a diagram illustrating multiplication of a signed multiplicand and an unsigned multiplier in an example approach.

FIG. 2E illustrates an example where a signed multiplicand an unsigned multiplier each 4-bits wide are multiplied according to the flowchart of FIG. 2A. In the description below also the multiplicand is referred to as A and multiplier as B.

In step 205, multiplicand (A) with binary value 1110 (−2 in decimal) and multiplier (B) 1001 (9 in decimal) are received. In step 210, type data in the form of a logic 1 for A and a logic 0 for B is received indicating that A is signed number and B unsigned number. In step 220, type data is checked and it is determined that type data indicates that A is signed and B unsigned. Thus, control would pass to steps 230/243.

In steps 235/243, a logic 0 bit is appended to the 5th bit position of A and a logic 1 bit (being the MSB of B) is appended to the 5th bit position of B.

In step 245, each of A and B is compared with a value binary 1000 (−8 decimal being the largest negative number in a 4-bit signed representation). Since at least one of A and B is not equal to binary 1000 overflow bit is a value logic 0, and control passes to step 247.

In step 247, signed multiplication of A with B is performed. The (2N)-bit product is obtained as decimal −18 (in twos complement form), by neglecting the higher order bits.

In step 250, the product (decimal −18) generated in step 247 and the overflow bit of value logic 0 are provided as outputs, correctly representing the desired result of the multiplication.

Thus, it may be seen from the above description that a single signed multiplication procedure can handle all combinations of operands (signed and unsigned integers). Consequently, a single signed multiplier unit may be used for handling signed and/or unsigned operands by appending an additional bit (extend bit) as described above.

Further, some of the steps noted above can be executed in parallel, thereby completing the multiplication operation in a shorter time, as described below with an example circuit.

8. Example Circuit

Figure 3:
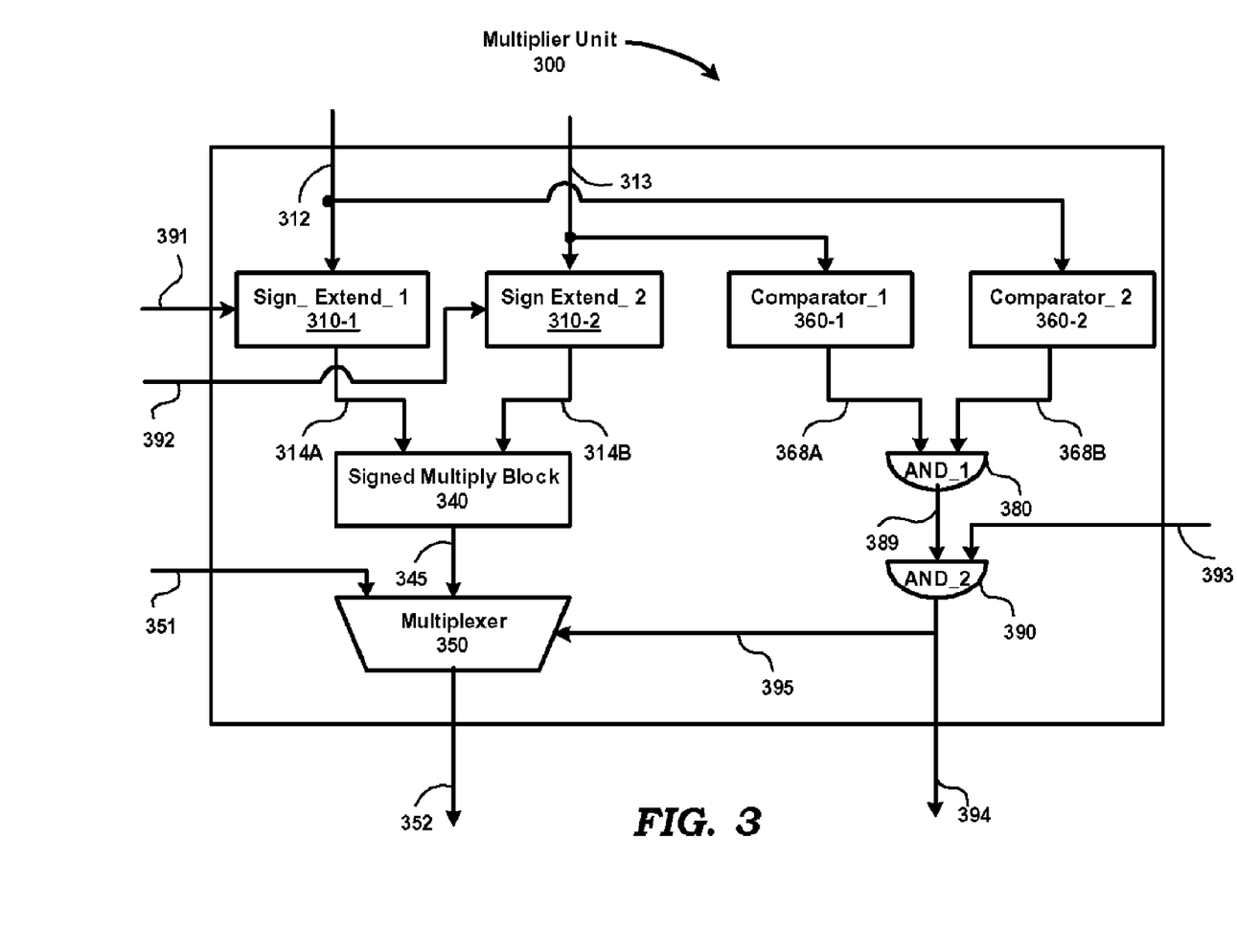
FIG. 3 is a block diagram illustrating the details of a multiplier unit in an embodiment of the present invention.

FIG. 3 is a block diagram of a multiplier unit in an embodiment of the present invention. The diagram shows multiplier unit 300 containing sign extend blocks sign_extend_1 (SE1) 310-1 and sign_extend_2 (SE2) 310-2, comparators comparator_1 (360-1) and comparator_2 (360-2), signed multiply block (SMB) 340, multiplexer (MUX) 350 and AND gates AND_1 (380) and AND_2 (390). The multiplier unit shown in FIG. 3 may be contained in an ALU of a processor (not shown). Each component is described in detail below.

SE1 310-1 receives an N-bit integer A on path 312 and type data 391 indicating whether integer A is signed or unsigned. SE1 310-1 appends an extend bit to integer A (after/to the left of the MSB position), and provides an (N+1)-bit integer on path 314A. The extend bit equals 1 in case the type data on path 391 indicates that A is signed most significant bit (MSB) of the N-bit integer equals a 1. The extend bit equals 0 otherwise. The resulting (N+1) bits are provided as an input to signed multiply block 340 on path 314A.

SE2 310-2 operates similar to SE1 310-1 except that the second integer received on path 313 is used as an input, and provides an (N+1)-bit output on path 314B. Type data is received on path 392. Integers on paths 312 and 313 may be provided by a register bank in an ALU (not shown), while type data 391 and 392 may be received from control logic in the processor (not shown).

SMB 340 receives two (N+1)-bit integers on paths 314A and 314B and provides the output (product) of a signed multiplication operation on the two (N+1)-bit integers. In general (at least in case of twos complement representation), signed multiplication entails recognition of a negative number when most significant bit equals a 1 and factoring that information into the computation of the result, as is well known in the relevant arts. The product (result) provided by SMB 340 on path 345 may be truncated (neglect unwanted higher order bits) to obtain the desired result.

Thus, SE1 (310-1), SE2 (310-2) and SMB (340) operate to provide a product of integers A and B. As described below, comparator_1 (360-1), comparator_2 (360-2), AND_1 (380) and AND_2 (390) operate to provide an overflow bit which indicates if the product of A and B is too large to be represented using the register/memory widths used in multiplier unit 300.

Comparator_1 360-1 receives N-bit integer B on path 313, and compares B with the largest N-bit negative integer. If B is equal to the largest N-bit negative integer, comparator_1 360-1 outputs a bit at logic 1 on path 368A, else provides a logic 0 on path 368A.

Comparator_2 360-2 receives N-bit integer A on path 312, and compares A with the largest N-bit negative integer. If A is equal to the largest N-bit negative integer, comparator_2 360-2 outputs a bit at logic 1 on path 368B, else provides a logic 0 on path 368B.

AND_1 1380 provides an ANDed logic output of the bits received on paths 368A and 368B on path 389. AND_2 (390) provides an ANDed logic output of the bits received on paths 389 and 393. Enable signal received on path 393 enables (when at logic 1) AND_2 390 to provide a valid overflow bit on paths 394/395, and disables AND_2 390 when at logic 0. Typically, enable signal 393 may be obtained from a control unit (not shown) based on the type of multiplication operation desired. For example, a multiplication operation may require that overflow condition needs to be checked and a saturate value be provided if there is an overflow. When both integers are unsigned, enable signal 393 would be a logic 0, and consequently the output of AND_2 390 would be a logic 0 (which is the desired overflow bit in such a case). When both operands are signed and an overflow condition exists (such a condition would need to be checked when the product is to be contained in 2N−1 bits) enable signal would be a logic 1.

MUX 350 provides on path 352 the product received on path 345 if the overflow bit received on path 395 is logic 0, and provides on path 352 a default saturation value received on path 351 if the overflow bit received on path 395 is logic 1. The default saturation value may be generated by registers contained in the processor (not shown). Thus, MUX 350 operates to provide either the product of A and B, or a saturation value depending on the overflow bit.

It may be appreciated from the description above that only a single signed multiply block is needed to handle signed and unsigned operands, thus reducing circuit implementation area. Overflow detection is done in parallel (by comparators and AND gates of FIG. 3) with the multiply operation (rather than in a sequential fashion). Thus, the result of the multiply operation may be obtained with smaller delays.

A multiplier unit designed according to aspects of the present invention may be incorporated in an example device as described next.

9. Device

Figure 4:
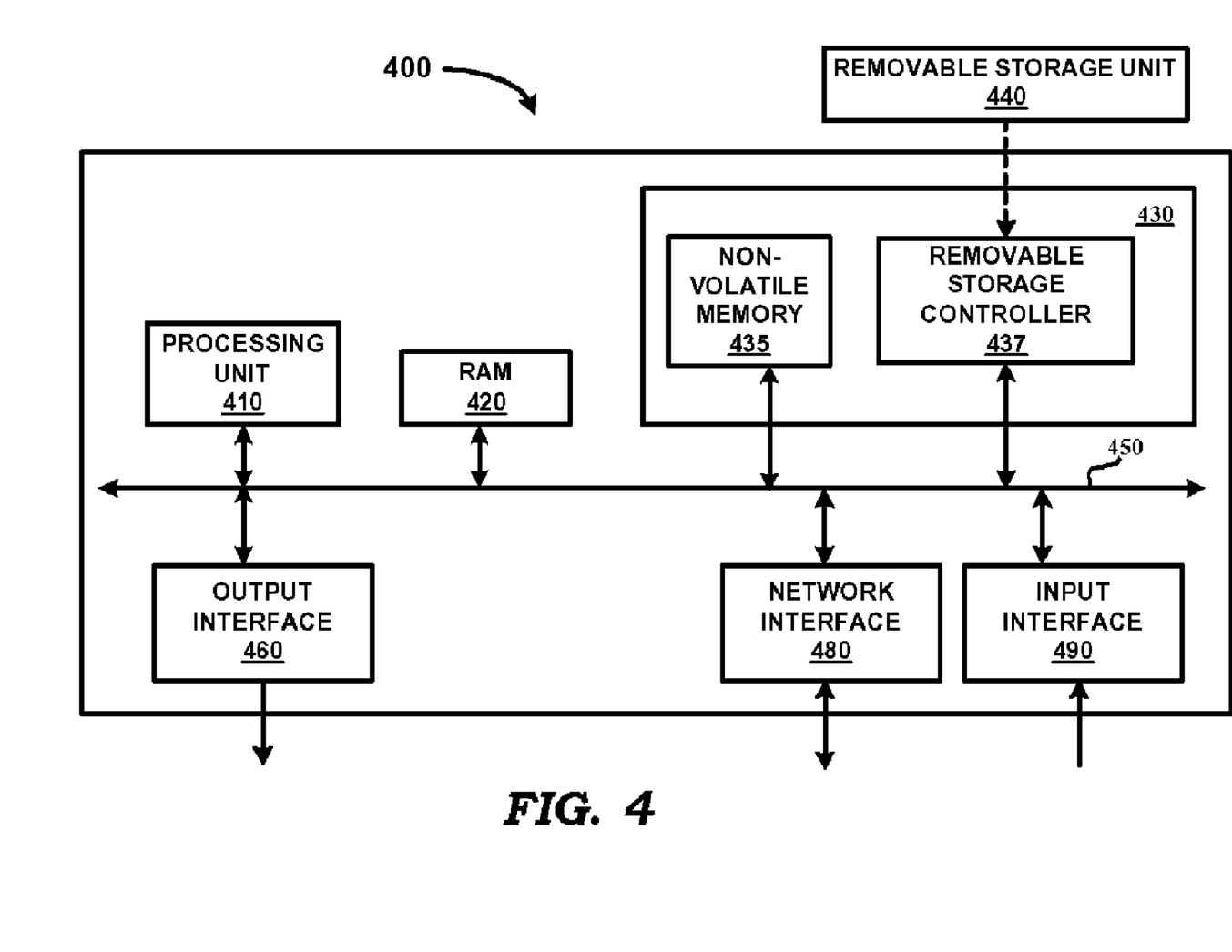
FIG. 4 is a block diagram illustrating the details of an example device implementing a multiplier unit in an embodiment of the present invention.

FIG. 4 is a block diagram illustrating the details of an example device 400 containing a multiplier unit according to the present invention in one embodiment. Device 400 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface. Input interface 490 (e.g., interface with a key-board and/or mouse, not shown) enables a user to provide any necessary inputs to device 400.

Network interface 480 enables device 400 to send and receive data on communication networks. Network interface 480, output interface 460 and input interface 490 can be implemented in a known way.

RAM 420 and storage 430, may together be referred to as a memory. RAM 420 receives instructions and data on path 450 from storage 430, and provides the instructions to processing unit 410 for execution.

Storage 430 may contain units such as non-volatile memory 435 (for example, flash/hard drive) and removable storage controller 437. Storage 430 may store the software instructions and data, which enable device 400 to provide several features in accordance with the present invention.

Some or all of the data and instructions may be provided on removable storage unit 440, and the data and instructions may be read and provided by removable storage controller 437 to processing unit 410. Floppy drive, magnetic tape drive, CD-ROM drive, DVD Drive, Flash memory, removable memory chip (PCMCIA Card, EPROM) are examples of such removable storage controller 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

Processing unit 410 may contain a multiplier unit (described above with respect to FIGS. 2A and 3) in accordance with the present invention which may be used to generate products (or a default saturation value) of integers provided by instructions contained in RAM 420/storage 430/removable storage unit 440. In general processing unit 410 reads sequences of instructions from various types of memory medium (including RAM 420, storage 430 and removable storage unit 440), and executes the instructions. Multiplication operation may be performed as a result.

Implementations in other environments are also contemplated to be within the scope and spirit of several aspects of the present invention.

10. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of multiplying in a multiplier unit a first integer with a second integer to generate a result, wherein each of said first integer and said second integer can be in either signed or unsigned form, said method comprising:
   receiving at said multiplier unit said first integer, said second integer and type data indicating whether each of said first integer and said second integer is represented in signed form or unsigned form;
   appending a first extend bit to said first integer and a second extend bit to said second integer to generate a first extended integer and a second extended integer respectively, wherein said first extend bit equals a logic zero if said type data indicates that said first integer is represented in unsigned form and equals the most significant bit of said first integer if said type data indicates that said first integer is represented in signed form, wherein said second extend bit equals a logic zero if said type data indicates that said second integer is represented in unsigned form and equals the most significant bit of said second integer if said type data indicates that said second integer is represented in signed form;
   performing a signed multiplication operation of said first extended integer and said second extended integer to generate a product;
   generating an overflow bit indicating whether a result of the multiplication would fit in a number of bits used to represent said result; and
   providing as outputs said product and said overflow bit if said overflow bit indicates that said result would fit in said number of bits, and a default value and said overflow bit if said overflow bit indicates that said result would not fit in said number of bits.

2. The method of claim 1, wherein said appending and said performing are performed in parallel with said generating, whereby said result is provided quickly.

3. The method of claim 1, wherein each of said first integer and said second integer is N-bits wide, wherein N represents an integer, wherein said generating comprises:
   comparing each of said first integer and said second integer with a third integer, wherein said third integer equals the largest negative integer that can be represented by N bits;
   providing said overflow bit with a first logical value if each of said first integer and said second integer is a signed integer and equal to said third integer and said product is represented using (2−N1) bits, and another logical value otherwise.

4. The method of claim 3, wherein said type data represents a bit.

5. A multiplier unit multiplying a first integer with a second integer to generate a result, wherein each of said first integer and said second integer can be in either signed or unsigned form, said multiplier unit comprising:
   a sign extension circuit receiving said first integer, said second integer and type data indicating whether each of said first integer and said second integer is represented in signed form or unsigned form, and appending a first extend bit to said first integer and a second extend bit to said second integer to generate a first extended integer and a second extended integer respectively, wherein said first extend bit equals a logic zero if said type data indicates that said first integer is represented in unsigned form and equals the most significant bit of said first integer if said type data indicates that said first integer is represented in signed form, wherein said second extend bit equals a logic zero if said type data indicates that said second integer is represented in unsigned form and equals the most significant bit of said second integer if said type data indicates that said second integer is represented in signed form;
   a signed multiply block performing a signed multiplication operation of said first extended integer and said second extended integer to generate a product;
   an overflow determination circuit generating an overflow bit indicating whether a result of said signed multiplication would fit in a number of bits used to represent said result; and
   a multiplexer providing as an output said product if said overflow bit indicates that said result would fit in said number of bits, and a default value if said overflow bit indicates that said result would not fit in said number of bits.

6. The multiplier unit of claim 5, wherein each of said first integer and said second integer is N-bits wide, wherein N represents an integer, wherein said overflow determination circuit comprises:
   a first comparator comparing said first integer with a third integer, wherein said third integer equals the largest negative integer that can be represented by N bits;
   a second comparator comparing said second integer with said third integer;
   a first AND gate receiving the outputs of said first comparator and said second comparator and providing said overflow bit with a first logical value if each of said first integer and said second integer is a signed integer and equal to said third integer, and another logical value otherwise.

7. The multiplication unit of claim 6, further comprising a second AND gate receiving an enable signal which indicates whether said overflow bit is required as an output, wherein said second AND gate propagates the output of said first AND gate as said overflow bit if said enable signal indicates that said overflow bit is required.

8. A device comprising:
   a memory storing a first number and a second number;
   a multiplier unit multiplying a first integer with a second integer to generate a result, wherein each of said first integer and said second integer can be in either signed or unsigned form, said multiplier unit comprising:
   a sign extension circuit receiving said first integer, said second integer and type data, and appending a first extend bit to said first integer and a second extend bit to said second integer to generate a first extended integer and a second extended integer respectively, wherein said first extend bit equals a logic zero if said type data indicates that said first integer is represented in unsigned form and equals the most significant bit of said first integer if said type data indicates that said first integer is represented in signed form, wherein said second extend bit equals a logic zero if said type data indicates that said second integer is represented in unsigned form and equals the most significant bit of said second integer if said type data indicates that said second integer is represented in signed form;

a signed multiply block performing a signed multiplication operation of said first extended integer and said second extended integer to generate a product;

a overflow determination circuit generating an overflow bit indicating whether a result of the multiplication would fit in a number of bits used to represent said result; and a multiplexer providing as an output said product if said overflow bit indicates that said result would fit in said number of bits, and a default value if said overflow bit indicates that said result would not fit in said number of bits.

9. The device of claim 8, wherein each of said first integer and said second integer is N-bits wide, wherein N represents an integer, wherein said overflow determination circuit comprises:

a first comparator comparing said first integer with a third integer, wherein said third integer equals the largest negative integer that can be represented by n-bits;

a second comparator comparing said second integer with said third integer;

an AND gate receiving the outputs of said first comparator and said second comparator and providing said overflow bit with a first logical value if each of said first integer and said second integer is equal to said third integer and said type data indicates that each of said first integer and said second integer is signed, and another logical value otherwise.

* * * * *